United States Patent [19]

Mabuchi et al.

[11] 4,005,320
[45] Jan. 25, 1977

[54] BATTERY-POWERED ELECTRIC MOTOR ASSEMBLY

[75] Inventors: Kenichi Mabuchi, Tokyo; Yoshihisa Tsuchimochi, Ichikawa, both of Japan

[73] Assignee: Mabuchi Motor Co. Ltd., Tokyo, Japan

[22] Filed: July 26, 1974

[21] Appl. No.: 492,027

[30] Foreign Application Priority Data

July 31, 1973  Japan ............................... 48-86200
July 31, 1973  Japán ........................ 48-90613[U]
July 31, 1973  Japan ........................ 48-90616[U]
July 31, 1973  Japan ........................ 48-90617[U]

[52] U.S. Cl. ......................... 310/40 MM; 310/43; 310/68 A; 310/71; 310/89
[51] Int. Cl.² .................................... H02K 11/00
[58] Field of Search .......... 310/40, 40 MM, 50, 47, 310/68 R, 68 A, 71, 89

[56] References Cited
UNITED STATES PATENTS

| | | | |
|---|---|---|---|
| 2,079,356 | 5/1937 | Lukowski | 310/50 X |
| 2,963,598 | 12/1960 | Kent | 310/50 |
| 3,035,191 | 5/1962 | Kent | 310/50 |
| 3,375,381 | 3/1968 | Tavel | 310/68 X |
| 3,450,908 | 6/1969 | Mabuchi | 310/43 |
| 3,549,920 | 12/1970 | Tavel | 310/68 |

*Primary Examiner*—Donovan F. Duggan

[57] ABSTRACT

A disclosure is made of an electric motor assembly in which a motor casing containing a motor and a battery casing housing one or more batteries are coupled in a manner so that a motor energizing circuit is turned on or off by relative rotational displacement between said two casings and the motor is fixed within said motor case by means of a terminal or contact strip. Further disclosed are raised ridges or grooves provided on said battery casing as means of supporting the whole assembly of said electric driving device, a method of immovably fixing said battery casing where said motor casing is made free for rotational displacement, a method of facilitating rotational displacement of said battery casing where said motor casing is immovably fixed, and also a switching mechanism.

17 Claims, 30 Drawing Figures

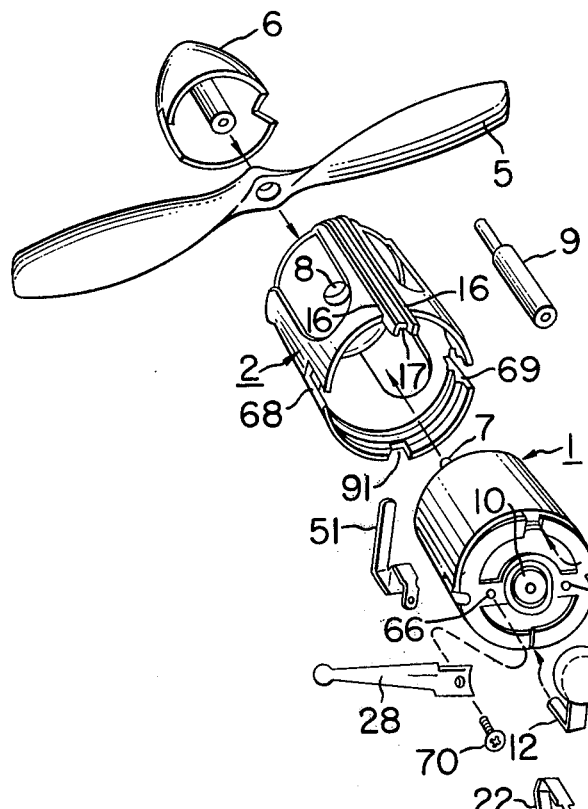
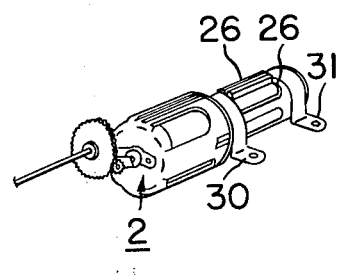
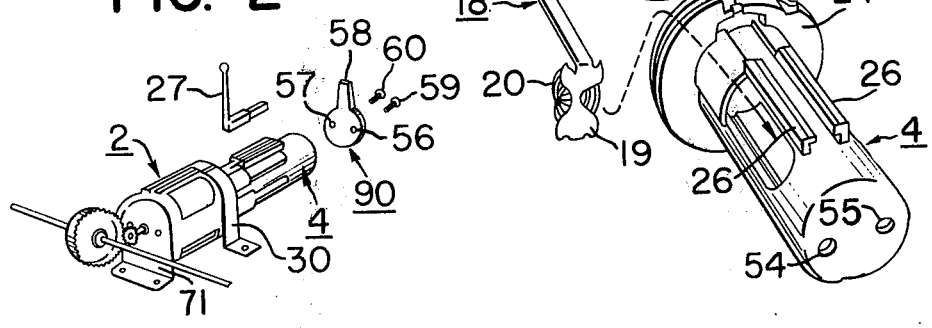

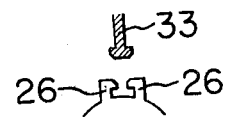
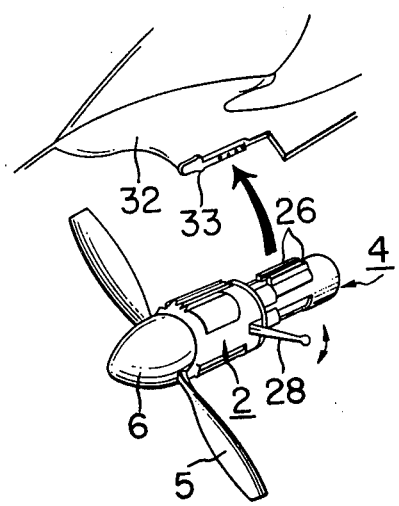
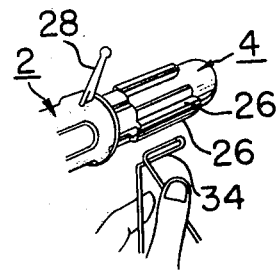
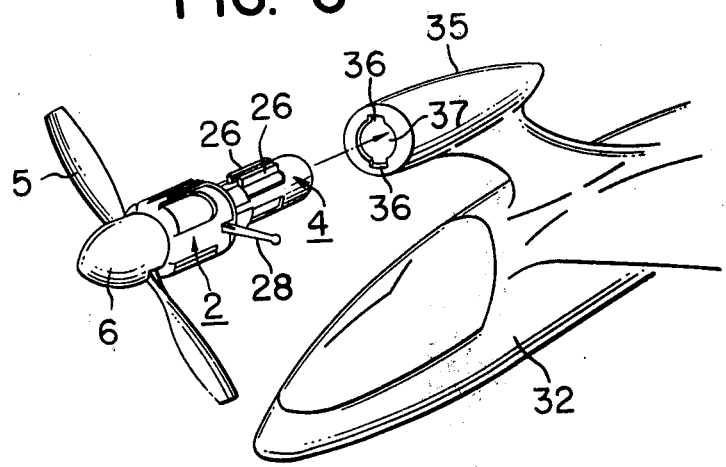
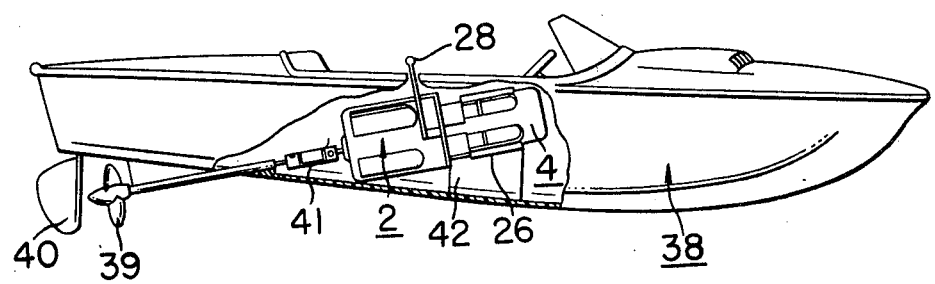

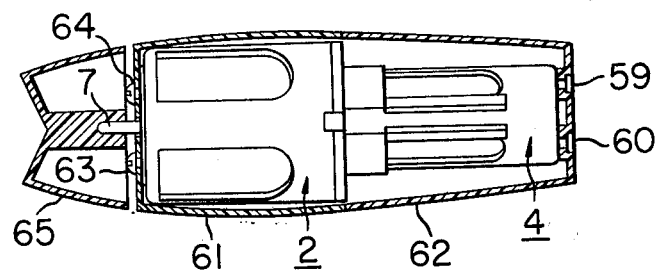
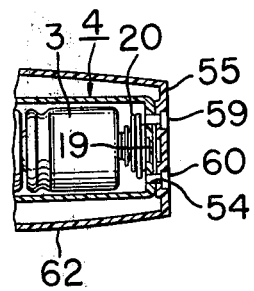
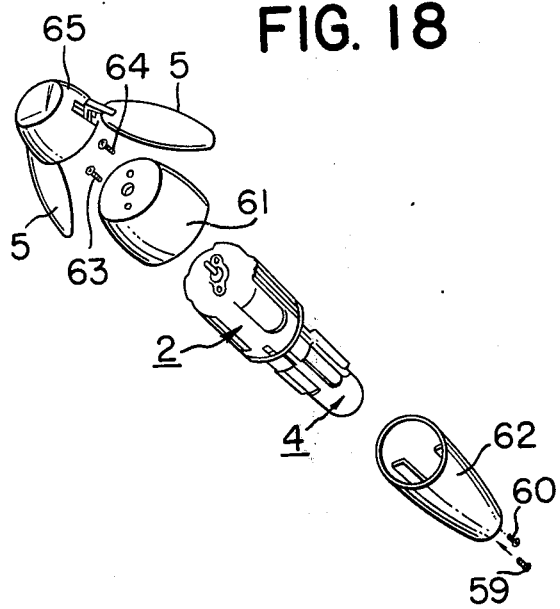
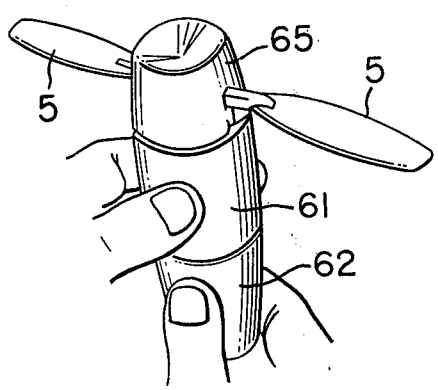

BATTERY-POWERED ELECTRIC MOTOR ASSEMBLY

BACKGROUND OF THE INVENTION

1. Field of the Invention

The present invention relates to a bettery-powered electric motor assembly and, more particularly, to an electric motor assembly in which a motor energizing circuit is turned on and off by means of relative rotational displacement between a motor casing and a battery casing.

2. Description of the Prior Art

Electric motor assemblies used in models or toys are generally known, in which a motor casing containing a motor and a battery casing housing one or more batteries are fitted together and connected and a motor energizing circuit is turned on and off by relative rotational displacement between these two casings.

As these electric driving devices are used, for example, to fly or run a battery-powered model airplane or boat, they require various means of solving a number of fine technical problems involved in such applications, including: relative positional displacement between the motor body and the motor casing; a switching mechanism for effecting ON-OFF operation of the motor energizing circuit by means of relative rotational displacement between the motor casing and the battery casing; rotational displacement of the battery casing where the motor casing is immovably fixed; rotational displacement of the motor casing where the battery casing is immovably fixed; means of effecting ON-OFF operation of the motor energizing circuit where rotational displacement between the motor casing and the battery casing is not structurally permitted; means of connecting the motor battery to a simple external circuit; gear mounting means; and other problems.

SUMMARY OF THE INVENTION

An object of the present invention is to provide an electric motor assembly in which relative positional displacement between a motor and a motor casing is prevented by means of a simple terminal or contact strip.

Another object of the present invention is to provide an electric motor assembly which is easy to mount and which also facilitates mounting of a switch lever or handle.

A further object is to provide an electric motor assembly which can be supported in a motor mount opening merely by inserting the assembly into the opening and turning.

A still further object is to provide an electric motor assembly having external leads that can be connected to energize an external electric device using the battery powering the motor.

Again, a still further object is to provide an electric motor assembly with key means that prevent relative rotational displacement between the motor casing and the battery casing when inserted, and also act as a lead.

Again, a still further object is to provide an electric motor assembly in which the battery casing has a member for mounting an external switch plate and a housing.

Again, a still further object is to provide an electric motor assembly with a switching mechanism that can ensure reliable ON-OFF control of the power circuit.

Again, a still further object is to provide an electric motor assembly in which the motor casing and the battery casing are securely and rigidly engaged together.

Again, a still further object is to provide an electric motor assembly having one or more gears in a manner that a gear shaft or shafts can be mounted in parallel with the motor shaft.

BRIEF DESCRIPTION OF DRAWINGS

FIG. 1 is an exploded perspective view of one embodiment of the present invention.

FIG. 2 illustrates how a motor casing of this electric motor assembly is immovably supported and how to fit a switch lever and other components onto a battery casing, and FIG. 3 illustrates the case where the battery casing is supported immovably.

FIG. 4A and FIG. 4B show the motor assembly mounted to the frame of a model airplane.

FIG. 5 shows a model airplane landing gear about to be mounted.

FIG. 6 illustrates a further example in which an electric motor assembly of the present invention is mounted onto a motor mount of a model airplane.

FIG. 7 shows an embodiment installed in a model boat.

FIG. 17 shows an embodiment where an electric motor assembly of this invention is accommodated in a motor housing and a battery housing of a small portable-type fan, FIG. 18 is an exploded perspective view of the fan of FIG. 17, and FIG. 19 illustrates how to operate the fan.

FIG. 20 is a cross-section of the battery housing in which the battery case is mounted.

DETAILED DESCRIPTION OF THE EMBODIMENT

Figure 8:
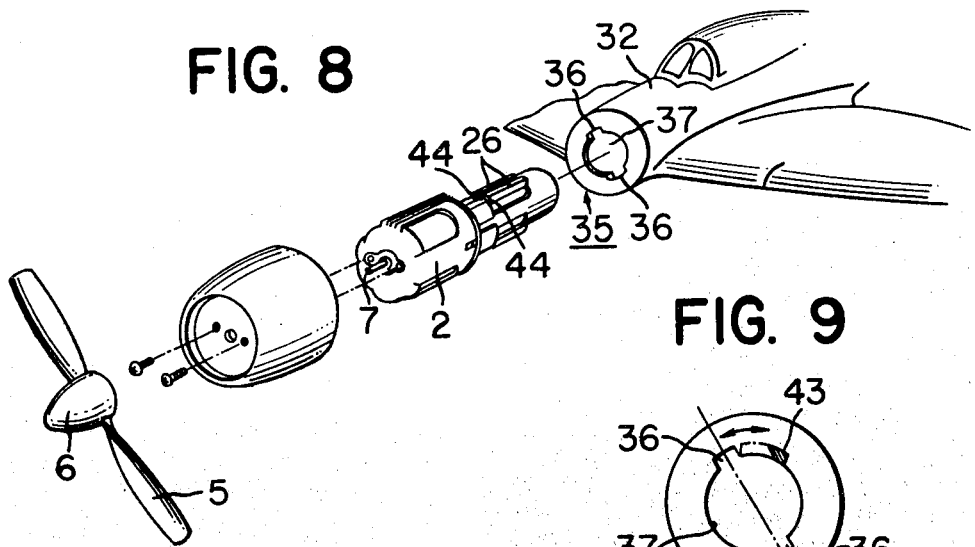
FIG. 8 is an exploded perspective view of an electric motor assembly of the present invention showing how the assembly is supported by a motor mount.

In FIG. 1, numeral 1 is a motor, 2 a motor casing or case, 3 batteries, 4 a battery casing or case, 5 a propeller, and 6 a spinner.

In the present invention, the motor 1 is fitted into the generally tubular motor case 2, and a driving shaft 7 of the motor 1 protrudes through an opening 8 formed in the end face of the motor case 2 to engage, via an extension shaft 9 if required, with the propeller 5 and the spinner 6. The other end 10 of the shaft 7 of the motor 1 fitted inside the motor case 2 is covered by a cap-shaped positive battery contact or terminal 11 which is electrically connected to the positive terminal (not illustrated) of the motor 1 by a tongue 12 of the terminal 11. A tongue 14 of a negative contact or terminal strip 13 is connected to the negative terminal (not illustrated) of the motor 1 as shown by an arrow head and broken line, and a U-shaped member 15 of the terminal strip 13 is inserted in a groove 17 between ridges 16 on the motor case 2 to prevent rotational displacement between the motor 1 and the motor case 2.

The generally tubular battery case 4, in which a contact or strip 18 has already been inserted, accommodates the batteries 3. The lead strip 18 has a spring seat 19 to support a spring 20 which contacts the negative electrode of the battery 3. The lead strip 18 has a lead section 21 running along the inner wall surface of the battery case 4 and also has at the end of a bend section 22. The bend section 22 is bent to run over the wall surface of an enlarged portion or flange 24 of the battery case 4 starting from the inside wall surface toward the outside wall surface, and a tongue 23 of the bend section 22 is held in a groove or depression 25 provided to the flange 24 to immovably fix the bend section 22. The battery case 4, having accommodated as above the batteries 3, engages with the motor case 2 fitted with the motor 1, and the positive electrode of the battery 3 thereby comes into electrical contact with the positive terminal 11. This engagement will be made so that a relative rotational displacement between the motor case 2 and the battery case 4 brings the U-shaped member of the above negative terminal 13 and the bend section 22 of the lead strip 21 in the battery case 4 into electrical contact to complete an electric circuit for the motor 1.

Ridges 26 are formed on the outer peripheral surface of the battery case 4 defining there between an axial groove (no numeral), the bottom at which in wider than the top. As will be described later, these ridges 26 are utilized for supporting the motor assembly of this invention and also for engaging with a switch handle or lever 27 which controls the rotational displacement of the battery case 4 and the motor case 2. In this respect, grooves may be formed in the battery case 4 to replace the above ridges 26. Also, a switch lever 28 is used to control the rotational displacement of the motor case 2 and the battery case 4 where battery case 4 is immovably mounted.

FIg. 2 illustrates a case where the motor case 2 is immovably fixed and the battery case 4 is rotationally displaced relative to the motor case 2. As described above in reference to FIG. 1, the switch lever 27 is inserted between ridges 26 on the surface for the battery case 4. In this illustration, the ridges 26 are utilized for engaging with the switch lever 27. Of course, a switch plate 90 may also be fixed onto the battery case 4 as shown in FIG. 2 for rotationally displacing the battery case 4 relative to the motor case 2.

FIG. 3 shows an example of a case where the battery case 4 is fixed by mounting means or bands 30 and 31. As is apparent in FIG. 1, a space is left on the battery case 4 between the flange 24 and ridges 26 and the mounting band 30 is disposed within this space.

FIGS. 4A and 4B illustrate a case where the electric motor assembly is mounted to a frame 32 of a model airplane by means of the ridges 26 provided in this invention on the battery case 4. In this case, 33 is a supporting or mounting member engaging between ridges 26, and it is shown that the battery case 4 engaged with the motor case 2 is fixed onto the frame 32 of the model airplane by having the mounting member 33 tightly fit between the ridges 26 on the battery case 4.

FIG. 5 shows how to mount a landing gear 34 of a model airplane by use of the ridges 26 provided in this invention. As shown in FIG. 5, the landing gear 34 has a U-shaped spring section which is tightly inserted into the groove formed between the ridges 26 for immovably mounting the landing gear 34.

FIG. 6 shows the electric motor assembly mounted on a model airplane by inserting the entire body of the battery case 4 into a motor mount 35 on the frame 32 of the model airplane. The motor mount 35 has an opening 37 having notches 36 which allow the ridges 26 of the battery case 4 to pass through when the electric motor assembly is inserted into the opening 37 as shown by an arrow head in FIG. 6, but when the electric motor assembly after insertion into the opening 37 is rotated leftward or rightward by, for example, about 30°, the assembly is prevented from detaching because the ridges 26 are held by the wall edge of the opening 37.

FIG. 7 illustrates a case where the electric motor assembly is mounted in a model boat by means of the ridges 26 provided by the present invention on the battery case 4. In the drawing, 38 is a hull of the model boat, 39 is a screw or propeller, 40 a rudder, 41 a universal joint, and 42 is a motor mount. In this embodiment, the motor mount 42 having a trapezoidal profile is fixed to the hull 38 to support the whole motor assembly at a predetermined angle as shown in the drawing, and the ridges 26 on the battery case 4 engage with the motor mount 42 in a manner that the motor mount 42 is tightly fit between the ridges 26. 28 represents the switch lever shown in FIGS. 4, 5 and 6.

As described above, the ridges 26 (or grooves) provided by this invention on the battery case 4 are very useful and offer many advantageous practical applications, as they make it possible to mount the switch lever 27 as shown in FIG. 2, to dispose the mounting band 30 as shown in FIG. 3, to grip the mounting member 33 of an airframe as shown in FIG. 4, to mount the landing gear 34 as shown in FIG. 5, to insert the battery case 4 into the opening 37 of the motor mount 35 as shown in FIG. 6, or to grip the motor mount 42 as shown in FIG. 7.

The above examples show cases of parallel alignment of the two ridges 26, but the prevent invention is not limitedly defined by the number of ridges 26, and grooves may also be formed instead of these ridges 26. Needless to say, the form, shape, or configuration of the switch lever 27, the mounting member 33, the landing gear 34, and the motor mounts 35 and 42 may also be selected depending on the number and the cross-section of these ridges or grooves, and a slide-in system and a snap-in system may both be used for these ridges or grooves.

Next, how to mount the battery case 4 onto an airframe will be described by referring to FIG. 8 and FIG. 9. As is apparent in FIG. 8, ends 44 of ridges 26 formed on the battery case 4 are located at a predetermined spacing from the flange 24 so that the battery case 4 may be inserted into and rotationally engaged with the motor mount 35.

Figure 9:
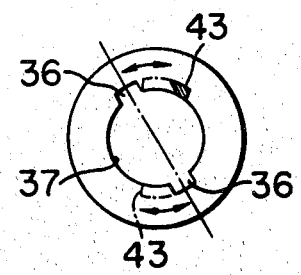
FIG. 9 shows an opening in the motor mount of this embodiment.

The motor mount 35 has an opening 37 with an inner diameter approximately the same as the outer diameter of the battery case 4, and the opening 37 has notches 36 for admitting the ridges 26 of the battery case 4 and also has on its opposite side, as shown expressly in FIG. 9, stoppers 43 for the ridges 26. The battery case 4 of the electric motor assembly, after aligning the ridges 26 with the notches 36 of the opening 37, is inserted into the opening 37 and engaged by rotating clockwise until the ends 44 and ridges 26 about inside the opening 37. In this example of a supporting method, the ridges 26 are prevented by the shape of the opening 37 from coming out and the electric motor assembly will never be pulled out of the airframe 32 even if the propeller 6 is very powerful. If desired for purposes such as recharging the batteries 3, the whole motor assembly can be detached from the motor mount 35 simply by rotating counterclockwise and then the battery 3 can be taken out by disengaging the battery case 4 from the motor case 2.

Another mode will now be explained, in which the ends of the motor case terminal and the battery case terminal are externally drawn out to form an external connecting circuit which may be opened and closed by means of, for example, a switch.

Figure 10:
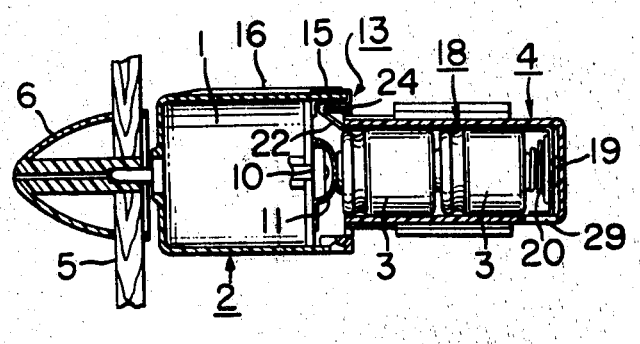
FIG. 10 is a cross-section of the motor casing and the battery casing engaged together.

As is apparent from FIG. 1 and FIG. 10, the end 10 of the shaft 7 of the motor 1 fitted in the motor case 2 is covered by the cap-shaped positive terminal 11 which is electrically connected to the positive terminal (not illustrated) of the motor 1 by the tongue 12 of the terminal 11. Also the tongue 14 of the negative terminal strip 13 is connected to the negative terminal (not illustrated) of the motor 1 as shown by the arrow head and broken line in the drawing, and the V-shaped member 15 of the terminal strip 13 is inserted in the groove 17 between the ridges 16 on the motor case 2 to prevent any rotational displacement between the motor 1 and the motor case 2.

Meanwhile, before accommodating the batteries 3, the battery case 4 receives the lead strip 18 which has the spring seat 19 to support spring 20 that contacts with the negative electrode of the battery 3. Also, the lead strip 18 has the lead section 21 running along the inner wall surface of the battery case 4 and also has at the bend section 22, and this bend section 22 is bent to run over the wall surface of the flange 24 of the battery case 4 starting from the inside wall surface toward the outside wall surface and the tongue 23 of the bend section 22 is held in the depression 25 provided to the flange 24 to immovably fix the bend section 22.

In this way, when the battery case 4, having accommodated the batteries 3 as described above, is engaged with the motor case 2 fitted with the motor 1, the positive electrode of the battery 3 comes into electrical contact with the positive terminal 11.

Figure 11:
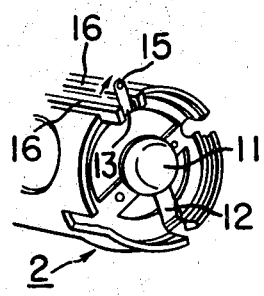
FIG. 11 is a perspective view of a terminal strip of the motor casing.

In the present invention, as is apparent in FIG. 11, the U-shaped member 15 of the negative terminal strip 13 is fitted between the ridges 16 on the motor case 2, and this V-shaped member 15 presents itself on the surface of the motor case 2.

Figure 12:
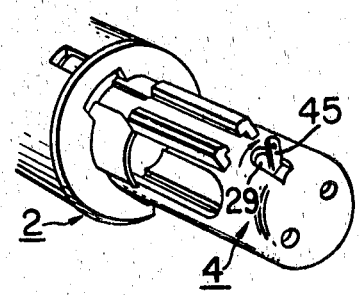
FIG. 12 shows a terminal strip of the battery casing.
Figure 13:
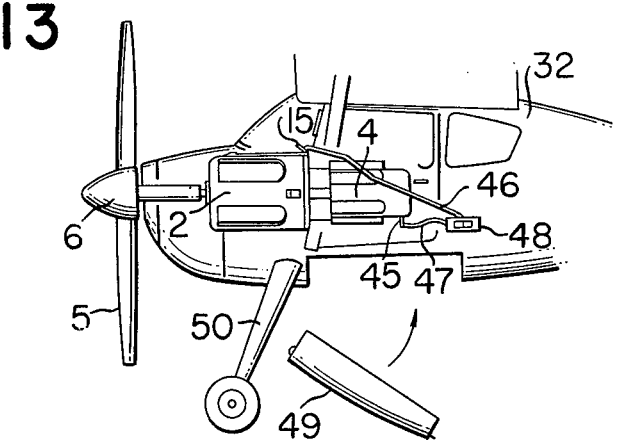
FIG. 13 illustrates the electric motor assembly installed in a model airplane.

Also in this invention, as shown in FIG. 12, a hole 29 is cut near the end of the battery case 4 and it is so disposed that a tongue 45 of the lead strip 18 reaches this hole 29 in a manner that the tongue 45 can rise and come forth through this hole 29 to serve as a connecting terminal. FIG. 13 illustrates how external lead wires 46 and 47 and a switch 48 are provided across the terminals 15 and 45 described in FIG. 11 and FIG. 12. In FIG. 13, 32 is the frame of a model airplane, 49 is a cover for loading and unloading the batteries 3, and 50 is a landing gear.

As shown in FIG. 13, where the entire motor assembly is sealed in the model airplane frame 32, it is difficult to provide means for rotatably displacing the motor case 2 and the battery case 4 relative to each other. Here, said means of relative rotational displacement is meant to be such means as the switch lever 27 or 28. In order to solve this problem, the terminals 15 and 45 in FIG. 13 are connected through the external leads 46 and 47 and the switch 48. In this case, it is needless to say that the switch 48 may be placed at any convenient location in the airframe 32.

As described above, the present invention provides an electric motor assembly assembled into a whole unit from the motor case 2 and the battery case 4 engaged together and has terminals 15 and 45 which lie down on the surface of the motor assembly and if required can be raised up to connect to the external leads 46 and 47. In this way, it is possible to provide the switch 48 between the external leads 46 and 47, where the whole electric motor assembly is sealed in as shown in FIG. 3, and in this case any rotational displacement between the motor case 2 and the battery case 4 is locked by a key 51 which also acts as a lead as will be described in FIG. 14.

Now, a further mode will be explained by referring to FIGS. 14 through 16, in which the batteries 3 in the battery case 4 are used to power an external automatic device as well as to power the motor 1.

Figure 14:
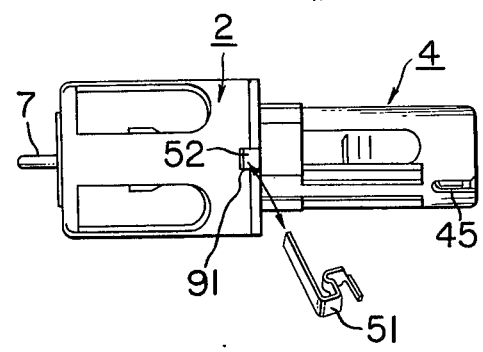
FIG. 14 shows how a key, which also acts as a lead, is to be inserted.
Figure 15:
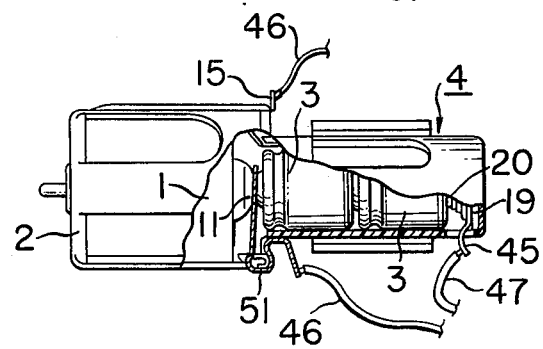
FIG. 15 illustrates how power is fed to an external automatic device by the above lead key.
Figure 16:
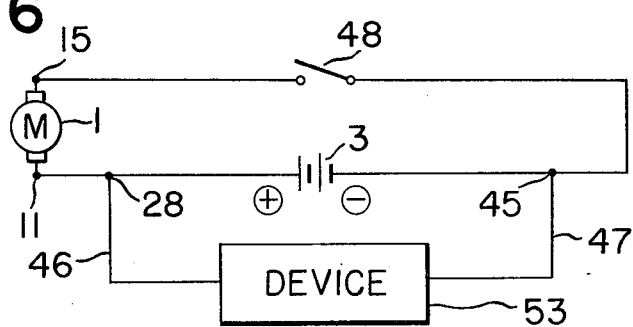
FIG. 16 is an electric circuit diagram in the case of FIG. 15.

FIG. 14 illustrates how the key 51, which also acts as a lead, is inserted, FIG. 15 shows how power is directed to an external automatic device by the lead key 51, and FIG. 16 is an electric circuit diagram for the case of FIG. 15.

In the present invention, the key 51, which also acts as a lead, is utilized so that the batteries 3 in the battery case 4 may power an external automatic device. The lead key 51 is inserted into a keyhole 52 (see FIG. 14) formed by an indent 91 on the edge of the motor case 2, and into a similar indent on the battery case 4, but located on the reverse side and hence invisible in FIG. 1. The keyhole 52 corresponds to the location of the tongue 12 of the cap-shaped positive terminal 11 in FIG. 1 so that the lead key 51, while being inserted, slides on the vertical section of the tongue 12 of the positive terminal 11 for smooth insertion between the positive terminal 11 and the positive electrode of the battery as will be described referring to FIG. 15.

FIG. 14 expressly illustrates the above keyhole 52. It is so disposed that, only when the motor case 2 and the battery case 4 are relatively rotationally displaced so that the negative terminal 13 of the motor case 2 and the lead strip 18 of the battery case 4 do not contact, the key hole 52 and indent 29 of the motor case 2 and the battery case 4 align to admit the lead key 51. And in this position with the key 51 inserted as above, relative rotational displacement between the motor case 2 and the battery case 4 is prohibited by the key 51. In FIG. 14, the lead terminal 45 is visible toward the right end of the battery case 4. As described in reference to FIG. 12, this terminal 45 is electrically connected to the negative terminal of the battery 3. FIG. 15 shows the lead key 51 as inserted between the cap-shaped positive terminal 11 of the motor 1 and the positive terminal of the battery 3. In this condition the positive terminal of the battery 3 is connected through the lead key 51 externally to the lead wire 46 which is now soldered to the end of the key 51. Also, the negative terminal of the battery 3 is led out by the above lead terminal 45 to be soldered to the lead wire 47. FIG. 16 shows an electric circuit formed where the battery 3 is disposed to power an external automatic device via the lead wires 46 and 47. In the drawing, 48 represents a switch and 53 the automatic device.

The automatic device mentioned here may be, for example, in the case of a model airplane, a device such as an electrical dethermalizer for effecting automatic forced descent or a simple flight controller.

In the case of a model boat, the device may be such as an early warning device for voltage drop of the battery or various other automatic devices (or control devices).

As described above, the present invention provides means whereby the electric motor assembly assembled into a whole unit from the motor case 2 and the battery case 4 allows the battery 3 fitted in the battery case 4 to be conveniently used to power one or more external devices, making it unnecessary to provide a separate power source for such devices as simple automatic controls.

Also, as the lead key 51, while being inserted, slides on and along the vertical section of the tongue 12 of the cap-shaped terminal 11 shown in FIG. 1, it can always be inserted correctly.

There may be cases where the methods of mounting the whole motor assembly make it difficult to fit the switch lever 27 or 29 as shown in FIG. 1, or some modes of operating the whole assembly make it objectionable to have the switch levers 27 and 28 protrude externally. The following description illustrates solution of these problems referring to FIG. 2 and FIGS. 17 through 20.

FIG. 2 illustrates how to mount a switch plate onto the battery case 4, FIG. 17 is a cross-section of a small portable fan formed by accommodating the whole electric motor assembly in a motor housing and a battery housing, and FIG. 18 is an exploded view of the fan. FIG. 19 illustrates the mode of operating the fan, and FIG. 20 is a cross-section of a battery housing in which the battery case 4 with a battery 3 is mounted.

As shown in FIGS. 1 and 2, the present invention considers that the end of the battery case 4 be provided with such means as tapped holes 54 and 55 for mounting external members, and thereby the switch plate 90 instead of the switch lever 27 may be mounted. The switch plate 90 has holes 56 and 57 matching the above tapped holes 54 and 55 on the battery case 4 and also a projection 58, and screws 59 and 60 fix the switch plate 90 onto the battery case 4. In this case, the motor case 2 is fixed to a support by such means as the mounting belt 30, but the battery case 4 may be rotated relative to the motor case 2 by turning the projection 58 of the switch plate 90, thereby closing or opening the power circuit. FIGS. 17 through 20 illustrate the electric motor assembly as adapted for use in a small portable fan.

As shown in the drawings, the motor case 2 and the battery case 4 engaged and coupled together are mounted in a manner that a motor housing 61 is fastened to the motor case 2 with screws 63 and 64 and a battery housing 62 is fastened to the battery case 4 with the screws 59 and 60. In other words, as is apparent in FIG. 20, the battery housing 62 is fastened to the battery case 4 with screws 59 and 60 by having the holes on the battery housing 62 match the tapped holes 54 and 55 provided in this embodiment of the present invention on the battery case 4. Also, as shown in FIG. 18, the motor housing 61 is fastened to the motor case 2 with the screws 63 and 64, and a spinner 65 having the propeller or fan 5 is mounted to the driving shaft 7 of the motor 1. In this case, as is apparent in FIG. 19, the whole portable assembly is operated as a fan by holding the motor housing 61 in the user's left or right hand and the battery housing 62 in his other hand and by rotationally displacing both housings relative to each other thereby starting of stopping the fan rotation. In the case of this example, there is no objectionable protrusion of the switch lever 27 or 28 which otherwise would be used for displacing the motor case 2 and the battery case 4 relative to each other.

As described above, the present invention provides for means, other than the switch lever 27 or 28 show in FIG. 1, for rotationally displacing the motor case 2 and the battery case 4 relative to each other which may be provided simply by providing tapped holes 54 and 55 in the battery case 4 for mounting external members, making it possible to turn on or off the power circuit merely by rotationally displacing the motor housing 61 and the battery housing 62 relative to each other, particularly in such cases as this portable fan.

Needless to say, means for mounting external members is not limited to the above described tapped holes 54 and 55 but a variety of other forms may be utilized. For example, the tapped holes 54 and 55 may be replaced by stems, projections, depressions, engaging blocks, slide-in blocks, or snap-in blocks.

Next, a still further mode will be described in which a switch lever mechanism may be mounted in a direction to be selected as required, to deal with cases where the switch mechanism for relative rotational displacement between the motor case and the battery case can not be mounted in a certain normally determined direction.

Figure 21:
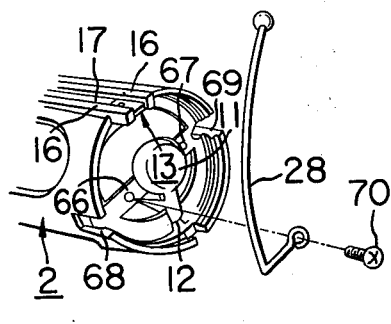
FIG. 21 is a perspective view showing how a switch lever of a different shape is mounted.

FIG. 21 is a perspective view illustrating how to fit a specially shaped switch lever. As shown in FIG. 21, one or more tapped or threaded holes are provided in the face of the stator of the motor 1, and the skirt of the motor case z has one or more openings or notches 68 and 69. The switch lever 28 is fastened with a screw 70 onto the side having the tapped hole 66, in a case where it is convenient to fit the switch lever 28 leftward with the propeller 5 on the opposite side, as illustrated. In this case, the arm of the switch lever 28 protrudes through the notch 68 of the motor case 2 so that the motor 1 and the motor case 2 are interlocked to be rotationally displaced relative to the battery case 4.

Where it is convenient to fit the switch lever 28 rightward with the propeller 5 on the opposite side, or in a manner opposite to that illustrated, the switch lever 28 is fastened to the side having the tapped hole 67 and the arm of the switch lever 28 protrudes through the notch 69. In addition, provision of these notches 68 and 69 makes the skirt of the motor case 2 somewhat elastic helping the motor case 2 engage with the battery case 4.

Next, the switch mechanism of the electric motor assembly of the present invention, which is turned on or off by the relative rotational displacement of the assembly, will be explained.

In the present invention, as is apparent in FIG. 10, the negative terminal strip 13 connected to the negative terminal of the motor 1 extends along the upper inside surface of the skirt of the motor case 2 and is bent upward to engage in the groove 17 between ridges as illustrated in FIG. 1. Namely, the negative terminal strip 13 is in close contact with the inside surface of the skirt of the motor case 2.

As is apparent in FIG. 10, the bend section 22 of the lead strip 18 inserted in the battery case 4 is bent to run over the inner surface of the battery case flange 24 toward the outer surface and is exposed on and in close contact with the surface. And when the motor case 2, containing the motor 1 and fitted with the negative terminal strip 13, and the battery case 4, accommodating the batteries 3 and fitted with the lead strip 18, are engaged together and then rotationally displaced relative to each other, the inwardly exposed surface of the negative terminal strip 13 and the outwardly exposed surface of the bend section 22 of the lead strip 18 are brought in sliding contact. In this case, as the negative terminal strip 13 is in close contact with the inside surface of the skirt of the motor case 2 and the bend section 22 of the lead strip 18 is also in close contact with the surface of the flange 24 of the battery case 4, both members always will be brought into sliding contact correctly and also will be brought out of contact correctly, without being bent or deformed.

Figure 22:
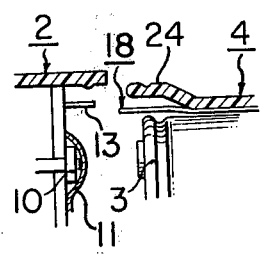
FIG. 22 illustrates a prior art construction of a rotary switch in section.

FIG. 22 illustrates a conventional structure of a rotary switch mechanism, in which numerals stand for structural parts or members corresponding to those in FIG. 10. In this conventional structure illustrated, a clearance just large enough to receive the flange 24 of the battery case 4 is provided between the negative terminal strip 13 and the inside surface of the skirt of the motor case 2, and another clearance for inserting the negative terminal strip 13 is provided between the tip of the lead strip 18 and the flange 24 of the battery case 4. In other words, it is so constructed that, when the motor case 2 and the battery case 4 have been engaged together and are rotationally displaced relative to each other, the flange 24 comes in between the negative terminal 13 and the inside surface of the skirt of the motor case 2 on the one hand and the negative terminal 13 comes in between the flange 24 and the tip of the lead strip 18 on the other hand, so as to bring the negative terminal 13 and the tip of the lead strip 18 into electrical contact.

In the above structure, the engagement of the motor case 2 and the battery case 4 would become difficult or the electrical contact between the negative terminal 13 and the tip of the lead strip 18 would become unreliable if either the negative terminal 13 or the tip of the lead strip 18 should be deformed. In fact, there have been extreme cases where the negative terminal 13 or the tip of the leading strip 18 was bent or twisted.

As explained above, an electric motor assembly according to the present invention completely remedies the above weakness of the conventional device and provides for easy engagement between the motor case 2 and the battery case 4 and also eliminates the possibility of unreliable electrical contact between the negative terminal 13 and the lead strip 18.

Since the motor 1 is cylindrical, the motor case 2 to be fitted with the motor 1 has a hollow which is also cylindrical, which makes it necessary to prevent the motor 1 and the motor case 2 fitted with the motor 1 from being rotationally displaced relative to each other. Also, as the external shape of the motor 1 is as a rule cylindrical, fixing the motor case 1 immovably onto a support requires means such as a belt for fightening. It may also be necessary to provide means for preventing the motor case 2 from trundling about, for example, on a workbench, and falling down. Again also, it is necessary to identify a correct insert position for engaging the motor case 2 and the battery case 4 together. Solutions to the above problems are described below.

This invention considers to solve the above problems at one stroke by providing ridges 16 and groove 17.

As described in reference to FIG. 1 and FIG. 11, the tongue 14 of the negative terminal strip 13 is fixed to the negative terminal of the motor 1 on one hand, and the V-shaped section 15, on the other hand, is fixed to the motor case 2 by being inserted into the groove 17 formed by ridges 16 on the motor case 2, with the result that the negative terminal strip 13 acts as a lock-key permitting no undesirable rotational displacement between the motor 1 and the motor case 2.

Also, to support the motor case 2 as shown in FIG. 2, the motor case 2 is immovably fixed onto a support by such means as the belt 30 and the end plate 71. As illustrated, the belt 30 is bent to conform with the ridges 16 and the groove 17 to securely hold in position the cylindrical motor case 2. FIG. 2 shows how a crown gear engages via, for a pinion gear fixed to the driving shaft 7 of the motor 1.

As described above, the present invention provides the motor case 2 with the ridges 16 which are to be engaged with the V-shaped section 15 of the negative terminal strip 13, prohibiting any undesirable rotational displacement of the motor 1 in the motor case 2 and making it possible to securely fix the motor case 2 to a support by the belt 30 taking advantage of the above ridges 16. In addition, the above ridges 16 can be used to identify the engaging position of each of the motor case 2 and the battery case 4 in coupling the two cases together. The ridges 16 will also prevent a cylindrical motor case 2 placed on a work bench from trundling about and falling down.

Next, a motor case 2 embodying the present invention to allow the motor case 2 and the battery case 4 to be securely and rigidly engaged together, will be described.

Figure 23:
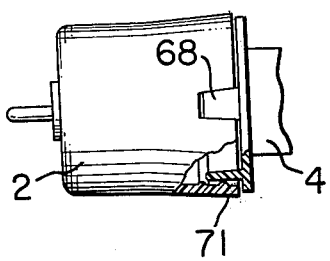
FIG. 23 illustrates, partly in section, the engagement of a motor casing showing problems.

As described above, the motor case 2 and the battery case 4 are engaged together, and ON-OFF switching of the power circuit is controlled by rotationally displacing these two cases 2 and 4 relative to each other. To facilitate this relative rotational displacement, the lever 28 is provided and the notches 68 and 69 are formed in the motor case 2, as illustrated in FIG. 21. In this respect, where the motor case 2 is constructed from somewhat soft material such as polyethylene, the skirt 71 of the motor case 2 may be undesirably expanded due to provision of the notches 68 and 69 as illustrated in FIG. 23, so that the motor case 2 may disengage from the battery case 2 when subjected to even a slight shock.

Figure 24:
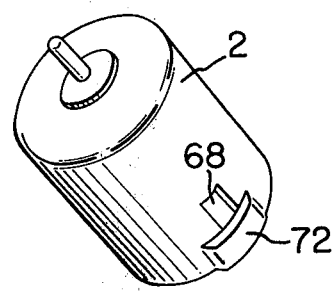
FIG. 24 is a perspective view of a motor casing used in an embodiment of this invention, and FIG. 25 the motor casing of FIG. 24 shown partly in section.
Figure 25:
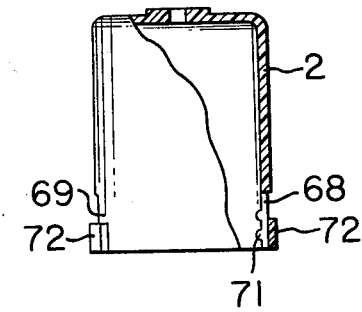

In consideration of the above problem, FIG. 24 and FIG. 25 show an embodiment of the present invention, which provides bridge-shaped reinforcements 72 across the lower portion of the above notches 68 and 69.

As the reinforcements 72 are integrally molded with the motor case 2 bridging the notches 68 and 69, the notches 68 and 69 can never be undesirably expanded to weaken the engagement of the motor case 2 with the battery case 4. Needless to say, when molding the motor case 2 used in this embodiment, these reinforcements 72 can easily be molded integrally with the motor case 2 merely by providing to the molding additional cavities corresponding to the reinforcements 72 and by filling plastic material into these cavities, serving the purpose of mass production. These reinforcements 72 bridge, the notches 68 and 69 on the skirt 71 of the motor case 2, but they provide no obstacle to the above mentioned lever 28 which can be mounted by having it obliquely protrude externally from the inside of the motor case 2.

The next description is a still further mode of the present invention where a gear mechanism or assembly is provided.

Conventionally, a gear mechanism is attached as a rule in the axial direction of the motor; therefore, the longer the distance in the axial direction of the motor, the greater becomes the extent of care that has to be taken, and, in particular, a good deal of attention is required to design a simple mechanism in which the driving shaft of the motor and the gear can be satisfactorily maintained in alignment.

The present invention provides means by which a gear mechanism can be attached simply by fastening with screws onto both faces of the motor as a gear assembly supported by a shaft support member of end plates.

Figure 26:
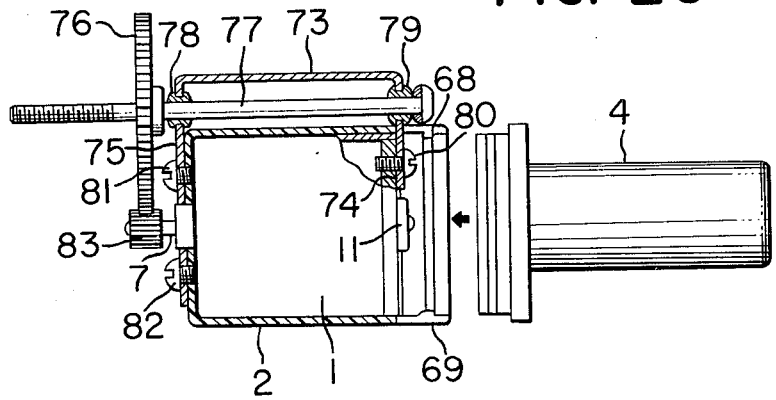
FIG. 26 is a side view, partly in section, of a motor assembly having a gear wheel, as an embodiment of this invention, and FIG. 27 an exploded perspective view illustrating the gear wheel attachment.
Figure 27:
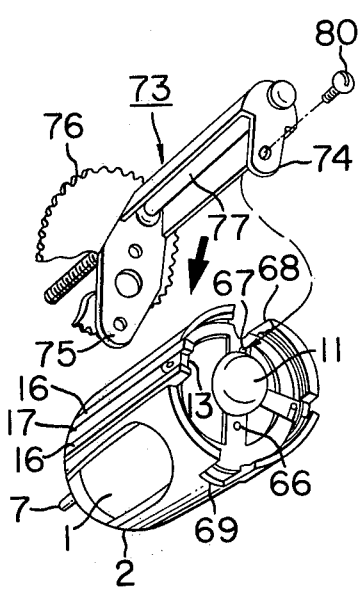
Figure 28:
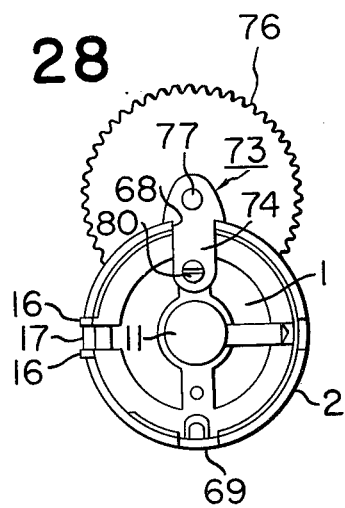
FIG. 28 is a rear view of the FIG. 27 motor having the gear wheel.
Figure 29:
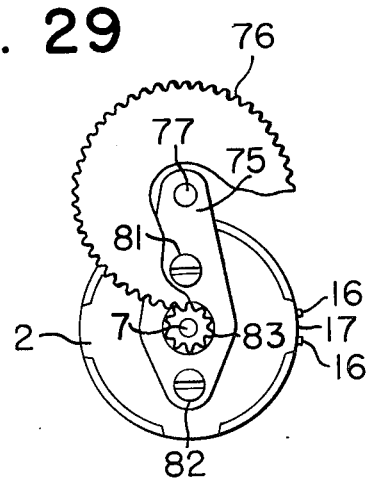
FIG. 29 is a front view, partly in section, of the same motor.

FIG. 26 is a cross-section side view of a motor having a gear assembly, and FIG. 27 is an exploded perspective view illustrating how the gear assembly is attached. FIG. 28 is a rear view of the FIG. 27 motor attached with the gear assembly, and FIG. 29 is a front view, partly in section, of the same motor.

In the drawings, 73 is a gear shaft support having member end plates 74 and 75.

A shaft 77 fixed to a gear wheel 76, and the shaft 77 is rotationally supported by bearings 78 and 79 in the end plates 74 and 75. The motor 1 is fitted in the motor case 2, and one of the terminals of the motor 1 is connected to the cap-shaped terminal strip 11 which is in electrical contact with the positive electrode of the battery (contained in the battery case 4 but not illustrated), and the other electrode of the motor 1 is electrically connected to the terminal strip 13 fitted in the motor case 2. As mentioned above, the motor case 2 is provided with the notches 68 and 69 and, as is apparent in FIG. 27 and FIG. 28, the above end plate 74 extends down through the notch 68 to be fastened with a screw 80 to one of the faces of the motor 1. The end plate 75 also is disposed as expressly illustrated in FIG. 26 and FIG. 29 over the face of the motor case 2 to be fastened onto the face with screws 81 and 82. The driving shaft 7 of the meter 1 protrudes outward from the motor case 2 to be mounted with a pinion gear 83 which is in meshing engagement with the above mentioned gear wheel 76. And the rotational speed of the motor 1 is reduced by the pinion gear 83 and the gear wheel 76.

As described above, the present invention provides a geared motor of extremely simple construction that can be completed simply by fastening end plates 74 and 75 of the gear support 73 onto both faces of the motor 1 with screws 80, 81, and 82. And the gear shaft 77 can be correctly maintained in parallel with the motor driving shaft 7 simply by correctly locating tapped holes for receiving these screws 80, 81 and 82.

In cases where a nickel-cadmium battery, instead of a conventional manganese dioxide battery, is employed in an electric motor assembly of the present invention, the problem of heat generation from the nickel-cadmium battery can of course be solved by providing the motor case 2 and the battery case 4 with openings for heat radiation.

Numerous changes may be made in the above described battery-powered electric motor assembly, and different embodiments of the present invention may be made without departing from the scope thereof. Therefore, it is intended that all matters contained in the foregoing description and in the accompanying drawing be interpreted as illustrative and not in a limiting sense.

What is claimed is:
1. A motor assembly comprising:
a electric motor;
a generally tubular motor casing to fixedly retain the motor therein, said motor casing having ridges formed on a surface thereof and a groove positioned between the ridges;
a generally tubular battery casing adapted to fixedly retain a battery therein, the motor and battery casing being axially aligned and rotatably connected at their ends so that an end of battery casing is slidably disposed inside an end of the motor casing, said battery casing having an enlarged diameter portion at the end thereof engaging with the motor casing and a groove formed on the surface of the enlarged diameter portion;
a battery contact connected to one terminal of the motor and adapted to contact one terminal of the battery;
a first electrical contact having a tongue portion and a U-shaped member, said first electrical contact being connected by said tongue portion to the other terminal of the motor, carried by the motor casing at substantially the inner periphery of the end thereof engaging with the battery casing, and inserted by said U-shaped member in said groove between the ridges on the motor case; and
a second electrical contact adapted to contact the other terminal of the battery, carried by the battery casing at substantially the outer periphery of the end thereof engaging with the motor casing, and held at said groove formed on the battery casing so that the first and second contacts ohmically engage to complete an electrical circuit between the battery and the motor at an expected position when the battery casing rotates relative to the motor casing.

2. A motor assembly according to claim 1, in which a threaded hole is formed in the motor stator and an opening is formed through the periphery of the motor casing.

3. A motor assembly according to claim 2, further comprising a handle connected to the motor stator by a bolt screwed into the threaded hole, the handle extending externally from the motor casing through the opening so that rotation of the handle will cause rotation of the motor casing relative to the battery casing.

4. A motor assembly according to claim 2, further comprising a gear assembly which includes:
   a pinion gear carried by the motor shaft;
   a gear shaft carrying thereon a gear meshing with the pinion; and
   a shaft support member rotatably supporting the gear shaft, a mounting portion of the shaft support member extending through the opening and being rigidly fixed to the motor by means of a bolt screwed into the threaded hole.

5. A motor assembly according to claim 3, in which the handle is resilient.

6. A motor assembly according to claim 2, in which the motor casing is formed with a reinforcing portion adjacent to the opening.

7. A motor assembly according to claim 1, in which the first and second contacts have portions adapted to extend externally from the motor casing and battery casing respectively.

8. A motor assembly according to claim 7, in which the motor casing and the battery casing are formed with holes through the peripheries thereof respectively which are adapted to align at a rotational position of the motor casing relative to the battery casing at which the first and second contacts are disengaged, the motor assembly further comprising a key member adapted to be inserted through the holes to maintain the motor and battery casings in said relative position, whereby the electrical circuit between the battery and the motor may be completed by means of an external electrical conductor connecting the first and second contacts.

9. A motor assembly according to claim 8, in which the key member is electrically conductive and is adapted to ohmically engage with the battery contact when inserted through the holes, a portion of the key member extending externally from the motor casing, whereby an external electrical device may be connected between the key member and the second contact to be powered by the battery.

10. A motor assembly according to claim 1, further comprising mounting means for rigidly supporting the motor casing and a handle rigidly fixed to the battery casing by which the battery casing may be rotated by the handle relative to the motor casing.

11. A motor assembly according to claim 1, further comprising mounting means for rigidly supporting the battery casing and a handle rigidly fixed to the motor casing by which the motor casing may be rotated relative to the battery casing.

12. A motor assembly according to claim 1, in which the battery casing is formed with an axial groove in its outer periphery, the bottom of the groove being wider than the top.

13. A motor assembly according to claim 12, further comprising a handle having an end portion with a profile conjugate to the profile of the groove in the battery casing, the end portion of the handle being adapted to tightly engage in the groove so that the battery casing may be rotated relative to the motor casing by means of the handle.

14. A motor assembly according to claim 12, in which the groove of the battery casing is adapted to engage with a portion of a supporting member having a profile conjugate to the profile of the groove, whereby the battery casing will be rigidly supported by the supporting member.

15. A motor assembly according to claim 12, in which the battery casing is formed with two axial ridges, the groove being formed between the two ridges.

16. A motor assembly according to claim 1, in which the end of the battery casing engaging with the motor casing is formed with an enlarged diameter portion and the battery casing is further formed with an axial groove in the outer periphery thereof, the axial groove being axially spaced from the enlarged diameter portion.

17. A motor assembly according to claim 1, in which the second contact is adapted to contact the terminal of the battery farthest from the end of the battery casing engaging with the motor casing, the second contact axially extending along most of the length of the inner periphery of the battery casing.

* * * * *